United States Patent Office 3,080,693
Patented Mar. 12, 1963

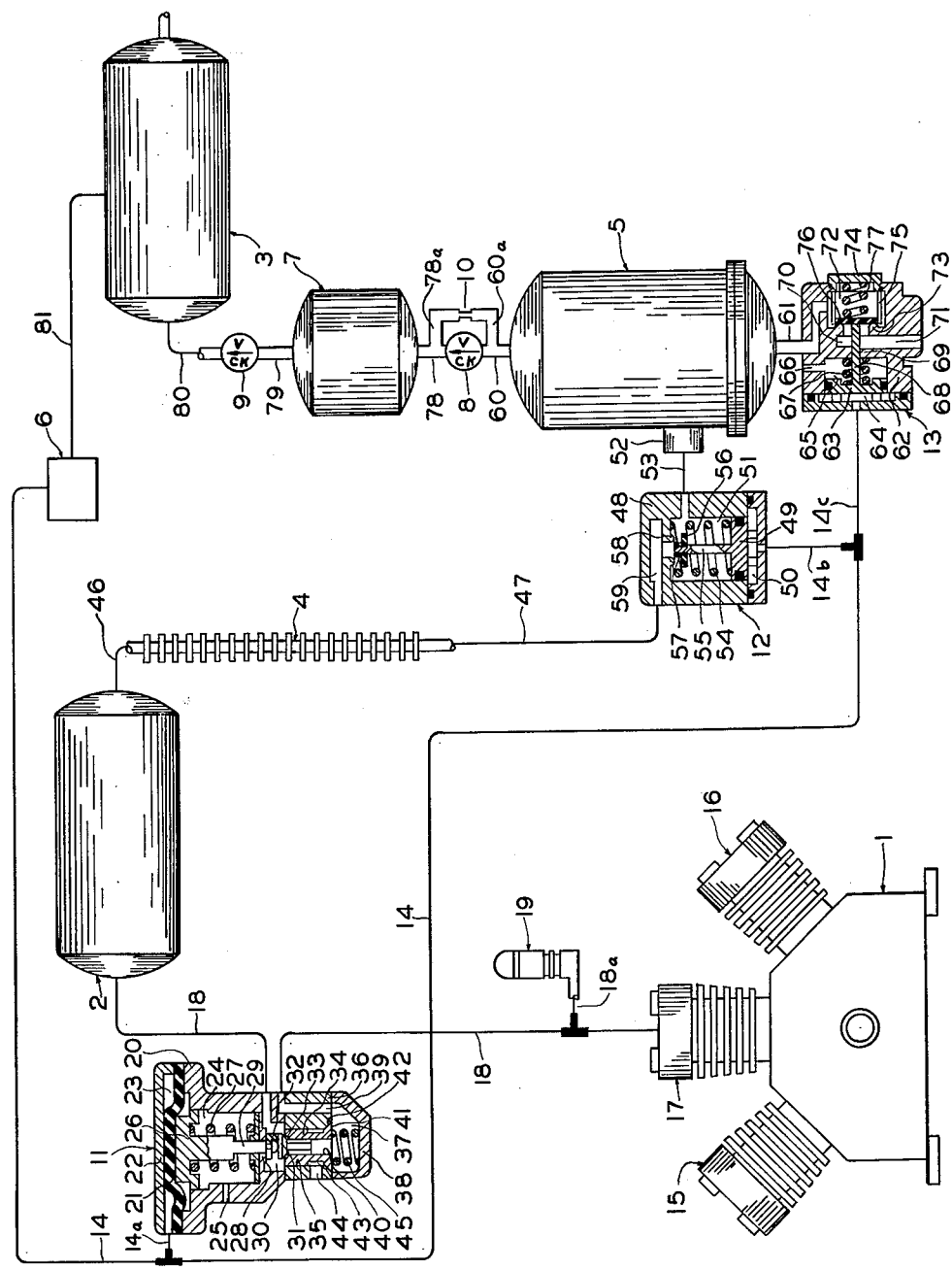

3,080,693
AUTOMATIC CLEANING APPARATUS FOR FILTERS IN COMPRESSED AIR SYSTEMS
William H. Glass, Pittsburgh, and Robert G. Widmyer, Irwin, Pa., assignors to Westinghouse Air Brake Company, Wilmerding, Pa., a corporation of Pennsylvania
Filed Oct. 29, 1958, Ser. No. 770,480
10 Claims. (Cl. 55—163)

This invention relates to apparatus for periodically automatically purging the contaminants from a filter unit of compressed air systems to reactivate the filtering medium in the filter unit.

Until recently the compressed air system used on railway locomotives included a filter unit having a felt type filtering element through which the compressed air passed in flowing from a storage reservoir to the air operated devices comprised in the locomotive and train air brake equipment. It has been found that the felt type filtering element is effective to remove dust, dirt and pipe scale in the compressed air but ineffective to remove oil vapor and water vapor which becomes entrained therein as the result of leakage of lubricating oil past the piston rings of the compressor piston and of the moisture present in atmospheric air taken into the compressor.

More recently there has been proposed for use in the compressed air system on locomotives a filter unit of the activated alumina desiccant type for removing both the oil vapor and the water vapor in the compressed air. A filter unit of this type is described and claimed in Patent No. 2,930,445 issued March 29, 1960, to William H. Glass and Jerome R. Pier and assigned to the assignee of this application.

Filter units of the activated alumina type, tested in actual compressed air systems on railway locomotives have proven to be very efficient in effecting the removal of contaminants in the form of oil vapor and water vapor in the compressed air passing through the filter unit. The efficiency of this type of filter unit is due to the adsorptive ability of the granular fines of activated alumina desiccant contained in the filter cartridges used as the filtering element. The term "fines" as used herein means tiny particles of crushed material.

The general purpose of this invention is to provide apparatus for automatically effecting cleansing and reactivating of a filter unit, such as a filter unit of the activated alumina desiccant type, during the time the air compressor in the compressed air system on the locomotive is operating unloaded.

The cleansing and reactivating apparatus of this invention comprises a purge reservoir disposed on the downstream side of the filter unit and valve means under the control of the compressor governor to automatically cause back flow of air from the purge reservoir through the filter unit to atmosphere upon operation of the governor to effect unloading of the compressor in response to attainment of a predetermined pressure in a storage reservoir charged by the compressor.

In the accompanying drawing the single FIGURE is a diagrammatic view, partly in section, showing one embodiment of the above-described invention.

Description

Referring to the drawing, there is shown a compressed air installation such as is usually found on diesel-electric railway locomotives wherein the air compressor is directly driven from the diesel engine on the locomotive. This installation comprises a compressor 1, two air pressure storage reservoirs 2 and 3 for receiving and storing the air under pressure delivered by the compressor 1, a finned type air cooled aftercooler 4 for cooling the compressed air as it flows from the first storage reservoir 2 to the second storage reservoir 3, a filter unit 5 such as that described in the hereinbefore mentioned patent, for removing oil vapor and water vapor from the compressed air flowing to the second storage reservoir 3, and a governor device 6 which may be of any suitable construction, for normally effecting the supply of air under pressure from the second storage reservoir 3 to the unloading mechanism of the compressor 1 upon the pressure in the second storage reservoir 3 attaining a chosen high pressure.

When a filter unit of the activated alumina type is used with the cleansing and reactivating apparatus of the present invention, the filter unit is placed in the pipe connecting a first storage reservoir to a second storage reservoir from which is supplied the compressed air used in the air operated devices in the train air brake equipment rather than in the pipe leading from the second storage reservoir as has heretofore been the practice when using the felt type of filtering element. By so locating the filter unit, warmer air can be used for the cleansing and reactivating process than would be the case if the air were obtained from the second storage reservoir for the reason that the compressed air in the second storage reservoir loses a certain amount of heat to the cooler atmospheric air surrounding the reservoir.

Also according to this invention, a cleansing and reactivating apparatus is further provided, which apparatus comprises a purge reservoir 7 interposed between the outlet of the filter unit 5 and the inlet to the second storage reservoir 3, a pair of check valves 8 and 9 for respectively preventing back flow from the purge reservoir 7 to the filter unit 5 and from the second storage reservoir 3 to the purge reservoir 7, a choke 10 connected in by-passing relation to the check valve 8 to permit flow of fluid under pressure between the purge reservoir 7 and the interior of the filter unit 5 at a controlled rate determined by the size of the choke 10, a fluid pressure operated unloading valve device 11 for effecting unloading of the compressor 1, a fluid pressure operated cut-off valve device 12 for controlling flow from the outlet of the aftercooler 4 to the inlet of the filter unit 5, and a fluid pressure operated drain valve device 13 for controlling expulsion of air under pressure from the interior of the filter unit 5 to atmosphere.

The fluid pressure operated valve devices 11, 12 and 13 are all connected to the governor device 6 by a pipe 14 having branches 14a, 14b, and 14c leading to the respective valve devices 11, 12 and 13.

The compressor 1 shown has two low pressure cylinders 15 and 16 and a high pressure cylinder 17. The air compressed by the compressor 1 is conducted from a discharge valve chamber (not shown) of the high pressure cylinder 17 to the first storage reservoir 2 through a pipe 18 having therein the unloading valve device 11 to permit connecting the discharge valve chamber of the high pressure cylinder 17 of the compressor 1 to atmosphere to unload the compressor in a manner hereinafter described. A branch pipe 18a connects the pipe 18 to a safety valve device 19 which may be of any suitable construction to limit the maximum pressure delivered by the compressor to the pressure setting of the safety valve device 19.

The fluid pressure operated unloading valve device 11 comprises a casing section 20 containing a diaphragm 21 clamped about its periphery between said casing and a cover 22 and defining with the cover a control chamber 23 open to the branch pipe 14a which leads through the pipe 14 to the governor 6. At the other side of the diaphragm is a spring chamber 24 which is open to atmosphere through a vent port 25. Contained in chamber 24 is a diaphragm follower 26 which is held in operative contact with the diaphragm 21 by a spring 27 interposed between the follower and a collar which rests against a partition wall 28 of chamber 24. Follower 26 has a stem 29 that extends through the collar and a central opening in the partition wall 28.

A chamber 30, open to that portion of the pipe 18 leading to the left-hand end of the storage reservoir 2, is formed in the casing 20 at the side of partition wall 28 opposite to chamber 24 and contains a valve 31 which is linked by means of a forked connection 32 to the lower end of follower stem 29, as viewed in the drawing. The valve 31 is adapted to make seating contact with a valve seat 33 formed on the upper end of a cylindrical valve member 34 which is slidably mounted in a bore 35 formed in a casing section 36 which is secured to the casing section 20 by any suitable means (not shown). The bore 35 in the casing section 36 extends from the chamber 30 to a chamber 37 formed in another casing section 38 secured to the casing section 36 by any suitable means (not shown). The chamber 37 is constantly open to the discharge valve chamber of the high pressure cylinder 17 of the compressor 1 by way of a passage 39 and that portion of pipe 18 that is connected to the cylinder 17.

The valve member 34 is provided with a through bore 40 encircled at its upper end by the valve seat 33 and has at its lower end a conical or poppet type valve 41 which valve is arranged for cooperation with a valve seat 42, formed on the casing section 36 at the lower end of bore 35, to control communication between chamber 37 and a chamber 43 defined by the wall of the bore 35 and a reduced portion of the valve member 34 and open to atmosphere through a passage 44. A spring 45 in chamber 37 constantly urges the valve member 34 upwardly to a position in which communication between chambers 30 and 37 is open and communication between chamber 37 and atmosphere is closed, as shown in the drawing.

The right-hand end of the first storage reservoir 2 is connected by a pipe 46 to the upper end of the aftercooler 4 and the lower end of the aftercooler is connected by a pipe 47 to the cut-off valve device 12.

The cut-off valve device 12 comprises a casing 48 containing a movable abutment, which may be in the form of a piston 49, at one side of which is a chamber 50 open through the branch pipe 14b to the pipe 14. At the opposite side of piston 49 is a chamber 51 open to an inlet connection 52 of the filter unit 5 through a pipe 53 and containing a bias spring 54 urging the piston 49 to the position in which it is shown in the drawing. The piston 49 has a stem 55 extending through the chamber 51 and carrying a disc valve 56 constructed of any suitable resilient material, such as rubber. The valve 56 is secured against a shoulder formed on the stem 55 as by a nut 57 screwed on the end of the stem. The valve 56 is arranged to be moved by stem 55 into contact with an annular valve seat 58 formed at one end of a bore connecting the chamber 51 to a second chamber 59 formed in the casing 48 to close communication between the chamber 51 and the chamber 59 to which one end of the pipe 47 is connected.

The filter unit 5 is illustratively shown as of the type described in the aforementioned patent.

Briefly, the filter unit 5 comprises a hollow cylindrical housing into the interior of which the inlet connection 52 opens, and in which is contained one or more metallic oxide desiccant cartridges, and a cylindrical permeable member of such porosity as to prevent the passage of fine particles of desiccant dust into the air stream which would cause detrimental effect to the control devices to which the air under pressure passing through the filter unit is supplied. The filter unit 5 is so constructed that the fluid under pressure entering the inlet connection 52 must flow to the bottom of the hollow cylindrical housing and thence upward serially through the cartridges and the permeable member to an air outlet boss located at the upper end of the hollow casing. The upper end of the hollow casing of the filter unit 5 is connected by a short pipe 60 to the inlet connection of the check valve 8 and the lower end of the casing is connected by a short pipe 61 to the drain valve device 13.

The drain valve device 13 comprises a casing containing a movable abutment which may be in the form of a piston 63 at one side of which is a chamber 64 open through the branch pipe 14c to the pipe 14. At the opposite side of the piston 63 is a chamber 65 open to atmosphere through a port 66 in the casing 62. The chamber 65 contains a bias spring 67 for urging the piston 63 to the position in which it is shown in the drawing. The piston 63 has a stem 68 extending through chamber 65, and a bore in a partition wall 69 into a chamber 70 which is constantly open via a port 71 to atmosphere. The chamber 70 is connected by a bore coaxial with the stem 68 to a second chamber 72 the end of the bore adjacent chamber 72 having formed thereon an annular valve seat 73. Screw-threaded into the casing 62 is a plug 74 having several circumferentially spaced fingers 75 extending into the chamber 72. Contained within the fingers 75, which serve as a guide therefor, is a flat disc valve 76, and disposed between the valve 76 and the plug 74 is a bias spring 77 for urging the valve 76 in the direction of the valve seat 73. Air under pressure supplied to chamber 64 shifts piston 63 against the force of spring 67 to cause the end of stem 68 to unseat valve 76 from valve seat 73, thereby connecting pipe 61 via chambers 72 and 70 to atmospheric port 71.

The hereinbefore mentioned pipe 60 has a branch 60a connected to one side of the choke 10. A pipe 78 having one end connected to the outlet side of the check valve device 8 and the opposite end connected to the lower end of the purge reservoir 7, has a branch 78a connected to the other side of the choke 10. The upper end of the purge reservoir 7 is connected by a pipe 79 to the inlet side of the check valve device 9, the outlet side of which is connected by a pipe 80 to one end of the second storage reservoir 3.

The second storage reservoir 3 is connected by a pipe 81 to the governor device 6 in order to provide for the supply of fluid under pressure to the pipe 14 and the devices 11, 12 and 13 upon operation of the governor device 6 in response to the pressure in the second storage reservoir 3 attaining the hereinbefore mentioned chosen high pressure.

*Operation*

In operation, let it be assumed that the diesel engine which drives the compressor 1 is stopped, the storage reservoirs 2 and 3 and the purge reservoir 7 are at atmospheric pressure, and the parts of the unloading valve device 11, the cut-off valve device 12 and the drain valve device 13 occupy the positions in which they are respectively shown in the drawing.

In the absence of fluid under pressure in the chamber 23 of the unloading valve device 11, the spring 27 acting through the casing 20 and diaphragm follower 26 will be effective to lift the valve 31 from its seat 33 and permit spring 45 to urge the valve 41 into contact with the valve seat 42. With the valve 31 thus unseated and the valve 45 seated, a fluid pressure communication will be established from the discharge valve chamber of the high pressure cylinder 17 of the compressor 1 through the pipe 18 and the unloading valve device 11 to the first storage reservoir 2.

In the absence of fluid under pressure in the chamber 50 of the cut-off valve device 12, the spring 54 acting through the casing 48 and piston 49 will be effective to lift the valve 56 from its seat 58. With the valve 56 unseated, a fluid pressure communication will be established from the lower end of the aftercooler 4 through the pipe 47, chambers 59 and 51 in the cut-off valve device 12, and the pipe 53 to the inlet connection 52 of the filter unit 5.

With no fluid under pressure present in the chamber 64 of the drain valve device 13, the spring 67 acting through the wall 69 and piston 63 will be effective to move the piston and stem 68 to the position in which they are shown in the drawing. In this position the spring 77 will be effective to seat the valve 76 on the seat 73 to close communication between the interior of the filter unit 5 and atmosphere.

When the diesel engine which is directly connected to the compressor 1 is started, it will operate the compressor to deliver air under pressure through the pipe 18 and the unloading valve device 11 to the first storage reservoir 2.

As the air under pressure delivered by the compressor 1 flows to the first storage reservoir 2, the pressure in the reservoir 2 will increase. Consequently, as the pressure in the first storage reservoir 2 increases, the air under pressure therein will flow therefrom through the pipe 46, aftercooler 4, pipe 47, chambers 59 and 51 in the now open cut-off valve device 12, and pipe 53 to the inlet connection 52 of the filter unit 5. The compressed air thus supplied to the inlet connection 52 of the filter unit 5 will flow therethrough to the pipe 60. In so doing, contaminants in the form of oil vapor and water vapor, in the compressed air will be condensed in the submicroscopic capillary fines consisting of the activated alumina desiccant with which the cartridges in the filter unit are filled. The moisture thus condensed forms small drops of water and globules of oil which remain within the dessicant as the fluid under pressure leaves the filter unit 5 through the pipe 60 and flows through the check valve device 8 and pipe 78 to the purge reservoir 7.

The pressure in the purge reservoir 7 will increase as air under pressure flows thereto from the filter unit 5. Therefore, as the pressure in the purge reservoir 7 increases, air under pressure will flow from this reservoir through the pipe 79, check valve device 9, and pipe 80 to the second storage reservoir 3.

From the above, it is apparent that the compressor 1 will supply air under pressure to the storage reservoirs 2 and 3 and increase the pressures therein.

When the air pressure in the second storage reservoir 3 has been increased to the hereinbefore mentioned chosen high pressure, the governor device 6 will operate in response to this pressure to supply air under pressure from the second storage reservoir 3 and pipe 81 to the pipe 14 from whence it will flow through branch pipe 14a to the chamber 23 of the unloading valve device 11, through branch pipe 14b to chamber 50 of the cut-off valve device 12, and through branch pipe 14c to chamber 64 of the drain valve device 13.

When the pressure of fluid thus supplied to chamber 23 of the unloading valve device 11 becomes sufficient to overcome the opposing force of spring 27, diaphragm 21 will deflect downwardly, moving valve 31 to its seated position and valve 41 to its unseated position respectively.

When the valve 31 is seated on its seat 33, the chamber 37 is cut off from the chamber 30, and when the valve 41 is unseated from its seat 42, the chamber 37 is connected to atmosphere through chamber 43 and passage 44. Therefore, the compressor 1 is now disconnected from the reservoir 2 and the discharge valve chamber of the high pressure cylinder 17 is connected through the lower branch of pipe 18, passage 39, chamber 37, past the now open valve 41 to the chamber 43 and thence through passage 44 to atmosphere. Consequently, the compressor 1 now operates unloading.

When the pressure of fluid supplied to the chamber 50 of the cut-off valve device 12 by the governor device 6 becomes sufficient to overcome the opposing force of spring 54, piston 49 will move upward until the valve 56 contacts its seat 58.

When the valve 56 is seated on its seat 58, the chamber 59 is cut off from the chamber 51. Therefore, communication between the pipes 47 and 53 is closed whereupon fluid under pressure ceases to flow from the first storage reservoir 2 into the filter unit 5 and thence to the second storage reservoir 3.

The governor device 6 supplies fluid under pressure to the chamber 64 of the drain valve device 13 simultaneously with the supply to the chamber 23 of the unloading valve device 11 and the chamber 50 of the cut-off valve device 12, and when the pressure of the fluid in the chamber 64 becomes sufficient to overcome the opposing force of the spring 67, piston 63 and stem 68 will move in the direction of the right hand as viewed in the drawing, whereupon the stem 68 is effective to unseat the valve 76 from its seat 73. When the valve 76 is thus unseated, the interior of the filter unit 5 and pipe 61 are connected through chamber 72, past the now open valve 76 and port 71 to atmosphere.

With the valve 56 of the cut-off valve device 12 now seated and the valve 76 of the drain valve device 13 unseated, the air under pressure now trapped in the purge reservoir 7 by the check valve device 9 will follow back through the pipe 78, branch pipe 78a, choke 10, branch pipe 60a, pipe 60, to the top of the filter unit 5 and thence successively through the permeable member and the cartridges in the filter unit 5, pipe 61, chamber 72, past the unseated valve 76 and through port 71 to atmosphere at a rate controlled by the size of choke 10. The fluid under pressure in the purge reservoir 7 will thus flow to the atmosphere until the pressure in the reservoir 7 is reduced to atmospheric pressure, it being noted that the time required for the pressure in the reservoir 7 to be reduced to atmospheric pressure is dependent upon or is a function of the volumetric capacity of the reservoir 7 and the size or cross-sectional area of the choke 10.

The effect of this reverse flow of air under pressure from the purge reservoir 7 through the desiccant in the cartridges within the filter unit 5 is to dislodge the condensation in the form of small drops of water and globules of oil from the surface of the activated alumina fines so that this condensation becomes entrained in the fluid pressure stream and passes therewith to the atmosphere.

At the time the drain valve device 13 is operated to open the valve 76, the pressures in the filter unit 5 and the purge reservoir 7 are substantially the same. After the valve 76 is opened, the pressure in the filter unit 5 and the purge reservoir 7 will reduce at substantially the same rate until the pressure in both devices is atmospheric pressure. As the pressure in the filter unit 5 is thus reduced, the pressure on the small drops of water and globules of oil within the submicroscopic capillary fines of the activated alumina is also reduced.

This reduction in pressure causes an evaporation of some of the droplets of water from the submicroscopic interior surfaces of the activated alumina fines so that the water vapor resulting from this evaporation becomes entrained in the dry fluid under pressure flowing from the purge reservoir 7 through these fines and is carried therewith to atmosphere.

The removal of the condensate in the form of water and oil from the desiccant in the manner explained above effects a reactivation of the desiccant whereby upon subsequent operation of the compressor 1 loaded, the filter unit 5 will be more effective to remove oil vapor and water vapor from fluid under pressure passing through the filter unit to the second storage reservoir 3 than at the time the compressor was unloaded.

After the pressure in the purge reservoir 7 has been reduced to atmospheric pressure by flow therefrom through the filter unit 5 and the drain valve 13, the cut-off valve device 12 will remain closed, the drain valve device 13 will remain open and the compressor 1 will operate unloaded until the use of fluid under pressure from the second storage reservoir 3 reduces the pressure therein to a second chosen pressure, which is lower than the hereinbefore mentioned chosen high pressure. Upon the pressure in the storage reservoir 3 being reduced to this second chosen pressure, the governor device 6 will operate in response thereto to establish a communication between the pipe 14 and atmosphere whereupon fluid under pressure will be released from chamber 23 of the unloading valve device 11, the chamber 50 of the cut-off valve device 12, and the chamber 64 of the drain valve device 13.

Upon release of fluid under pressure from the chamber 23 of the unloading valve device 11, the spring 27 will move the valve 31 to its unseated position and the spring 45 will move the valve 41 to its seated position in which position these valves are shown in the drawing. Upon the unseating of valve 31 and the seating of valve 41, a fluid pressure communication is established between the discharge valve chamber of the high pressure cylinder 17 of the compressor 1 and the first storage reservoir 2 so that the compressor 1 will now operate loaded and supply air under pressure to the storage reservoir 2.

Upon release of fluid under pressure from the chamber 50 of the cut-off valve device 12, the spring 54 will move the piston 49 and the valve 56 to the position in which they are shown in the drawing in which position the valve 56 is out of contact with its seat 58 and a communication is established between chambers 59 and 51. When a communication is thus established between the chambers 59 and 51, fluid under pressure that is supplied to the first storage reservoir 2 by the compressor 1 may flow from the reservoir 2 through pipe 46, aftercooler 4, pipe 47, chambers 59 and 51, and pipe 53 to the inlet connection 52 of the filter unit 5.

Upon release of fluid under pressure from the chamber 64 of the drain valve device 13, the spring 67 will move the piston 63 and stem 68 to the position in which they are shown in the drawing whereupon the spring 77 moves the valve 76 into contact with its seat 73. When the valve 76 is thus seated, communication is closed between the interior of the filter unit 5 and atmosphere. Therefore, the fluid under pressure flowing into the inlet connection 52 of the filter unit 5 will flow through the desiccant in the filter unit and thence through the pipe 60, check valve device 8, pipe 78, purge reservoir 7, pipe 79, check valve device 9, and pipe 80 to the second storage reservoir 3.

Fluid under pressure will be thus uppplied to the reservoir 3 from the compressor 1 unitl the pressure in the reservoir 3 again reaches the hereinbefore mentioned high pressure. When the pressure in the reservoir 3 reaches the hereinbefore mentioned high pressure, the governor device 6 will operate in response to this pressure to again supply fluid under pressure from the reservoir 3 to the pipe 14 and branch pipes 14a, 14b, and 14c whereupon the compressor 1 will be unloaded and the fluid under pressure in the purge reservoir 7 again will be vented to atmosphere through the filter unit 5 to reactivate the desiccant therein in the manner hereinbefore explained.

By venting the purge reservoir 7 to atmosphere through the desiccant in the filter unit 5 each time the compressor 1 is unloaded, the desiccant is reactivated so that its useful life extends over a period of time substantially much longer than would be the case if no reactivation were made during the time the compressor 1 is unloaded.

It will be understood that while the invention has been described with respect to compressed air systems, the apparatus is equally effective in connection with other types of compressible fluids or gases. Reference is therefore made in the appended claims to fluids or gases generally without limitation to compressed air.

Having now described the invention, what we claim as new and desire to secure by Letters Patent is:

1. Cleansing apparatus for a filter unit of the desiccant type disposed in a conduit connecting a fluid compressor to a storage reservoir, said cleansing apparatus being characterized by a purge reservoir charged with fluid under pressure delivered by the fluid compressor and fluid pressure operated valve means operated in consequence of the pressure in the storage reservoir reaching a chosen value for concurrently cutting off the supply of fluid under pressure to the filter unit and for effecting a supply of fluid under pressure from said purge reservoir through the filter unit to atmosphere in a direction opposite to the normal direction of flow of fluid under pressure therethrough to remove contaminants from and thus reactivate said filter unit.

2. Cleansing apparatus for a filter unit of the desiccant type disposed in a conduit connecting a fluid compressor to a storage reservoir, said cleansing apparatus comprising a reservoir separate from the storage reservoir for storing compressed fluid, fluid pressure operated valve means operated in consequence of the pressure in the storage reservoir reaching a chosen value for concurrently cutting off the flow of fluid under pressure from the compressor to the filter unit and for effecting a discharge of the fluid in said separate reservoir through said filter unit to atmosphere in a direction opposite to the normal direction of flow of fluid under pressure therethrough to remove contaminants from and thus reactivate said filter unit, and means for limiting the rate of flow of fluid from said separate reservoir in the direction of said filter unit.

3. Cleansing apparatus for a filter unit of the desiccant type disposed in a conduit connecting a fluid compressor to a storage reservoir, said cleansing apparatus comprising a purge reservoir, means for effecting charging said purge reservoir at a first chosen rate with fluid under pressure compressed by the compressor and filtered by flow through the filter unit in one direction, a first fluid pressure operated valve means for cutting off flow of compressed fluid through the conduit to the filter unit, a second fluid pressure operated valve means for effecting a discharge of the compressed fluid in said purge reservoir through said filter unit in a direction opposite to said one direction, means for limiting the rate of flow of said discharge of compressed fluid to a rate less than said first chosen rate, and means controlled by the pressure in the storage reservoir for effecting substantially simultaneous operation of said first and said second fluid pressure operated valve means.

4. A compressed fluid installation comprising a fluid pressure storage reservoir, a fluid compressor for charging said reservoir, filter means disposed between said compressor and reservoir for filtering contaminants from the compressed fluid flowing normally from the compressor to said reservoir, and reactivating apparatus for said filter means characterized by a source of dry filtered fluid under pressure, and fluid pressure operated valve means operated in consequence of the pressure in said storage reservoir reaching a chosen value for effecting a supply of dry filtered fluid under pressure from said source through said filter means to atmosphere in a direction opposite to the normal direction of flow of fluid under pressure therethrough to remove contaminants from and thus reactivate said filter means.

5. A compressed fluid installation comprising a fluid pressure storage reservoir, a fluid compressor for charging said reservoir, filter means disposed between said compressor and storage reservoir for filtering contaminants from the compressed fluid flowing normally to said storage reservoir, and reactivating apparatus for said filter means characterized by a purge reservoir charged by said compressor and fluid pressure operated valve means operated in consequence of the pressure in said storage reservoir reaching a chosen value for effecting a supply of fluid under pressure from said purge reservoir through said filter means to atmosphere in a direction opposite to the normal direction of flow of fluid under pressure therethrough to remove contaminants from and thus reactivate said filter means.

6. A compressed fluid installation comprising a pair of fluid pressure storage reservoirs, a fluid compressor for charging said reservoirs, and a filter means disposed between said reservoirs for filtering contaminants from the compressed fluid flowing normally from one of said reservoirs to the other of said reservoirs, and reactivating apparatus for said filter means characterized by a purge reservoir disposed between said filter means and said other reservoir on the downstream side of said filter means and chargeable with filtered fluid under pressure, two fluid pressure operated valve means operated substantially simultaneously in consequence of the pressure in said other reservoir reaching a chosen value for respectively cutting off flow of fluid under pressure from said one reservoir to said other reservoir and for effecting the supply of filtered fluid under pressure from said purge reservoir through said filter means to atmosphere in a direction opposite to the normal direction of flow of fluid under pressure therethrough to remove contaminants and thus to effect reactivation of said filter means.

7. For use in a compressed fluid installation of the type including a pair of series-connected fluid pressure storage reservoirs, a fluid compressor for charging said reservoirs, and a filter means disposed between said reservoirs for filtering contaminants from compressed fluid flowing from one of said reservoirs to the other of said reservoirs, reactivating apparatus characterized by a fluid pressure operated cut-off valve device disposed between said one reservoir and the inlet to said filter means to control communication between said one reservoir and said filter means, a purge reservoir disposed between the outlet of said filter means and said other reservoir, one-way flow means controlling flow from said filter means to said other reservoir, a restricted communication connected in bypassing relation to said one-way flow means, a fluid pressure operated drain valve device to control communication between the interior of said filter means and atmosphere, and fluid pressure operated means operated in response to the pressure in said other reservoir reaching a chosen value for effecting the supply of fluid under pressure from said other reservoir to said cut-off valve device and said drain valve device to, respectively, close a communication between said one reservoir and said filter means and open a communication between said purge reservoir and atmosphere through said restricted bypassing communication and said filter means whereby compressed fluid flows from said purge reservoir through said filter means to atmosphere in a direction opposite the direction of flow of compressed fluid through said filter means from said one to said other reservoir to effect removal of contaminants from the filter means and thus effect reactivation of the filter means.

8. In a compressor unit installation of the type having a fluid compressor arranged to deliver compressed fluid to a storage reservoir and a filter means disposed between said compressor and storage reservoir for filtering contaminants from the compressed fluid flowing to said storage reservoir, cleansing and reactivating apparatus for the filter means comprising a purge reservoir for storing a limited quantity of compressed fluid, said purge reservoir being disposed between said filter means and said storage reservoir, one-way flow means controlling flow from said purge reservoir to said storage reservoir, a fluid pressure operated cut-off valve device to control communication between said compressor and said filter means, a fluid pressure operated drain valve device to control communication between the interior of said filter means and atmosphere, and fluid pressure operated means operated in response to the pressure in said storage reservoir reaching a chosen value for effecting the supply of fluid under pressure from said other reservoir to said cut-off valve device and said drain valve device to, respectively, close communication between said compressor and said filter means, and open a communication between said purge reservoir and atmosphere whereby a limited quantity of compressed fluid flows from said purge reservoir through said filter means in a direction opposite to the direction of flow of compressed fluid through said filter means from said compressor to said storage reservoir to effect removal fo contaminants from the filter means and thus effect reactivation of said filter means.

9. In a compressor unit installation, the combination of a fluid compressor, a storage reservoir and a purge reservoir each charged with fluid under pressure by said compressor, filter means for filtering contaminants from compressed fluid delivered by said compressor, conduit means for conducting compressed fluid from said compressor through said filter means to said reservoir, a check valve device in said conduit on the outlet side of said filter means, fluid pressure operated valve means for closing communication between said compressor and said filter means, fluid pressure operated valve means for opening the interior of said filter means to atmosphere, a by-pass conduit connected to said filter means in bypassing relation to said check valve device for conducting fluid under pressure from said purge reservoir to said filter means, and means operable in response to a chosen pressure in said storage reservoir for effecting simultaneous operation of said two fluid pressure operated valve means whereby communication between said compressor and said filter means is closed and communication between the interior of said filter means and atmosphere is opened to permit flow of fluid under pressure from said purge reservoir through said by-pass conduit and said filter means to atmosphere to effect removal of contaminants therefrom and thus to effect reactivation of said filter means.

10. In a compressor unit installation the combination with two storage reservoirs, connected in series, a compressor, and means for delivering compressed fluid from said compressor to said storage reservoirs, of filter means disposed between said two storage reservoirs for filternig contaminants from compressed fluid delivered by said compressor to the first of said two storage reservoirs, a purge reservoir for storing a limited quantity of compressed fluid, said purge reservoir being disposed between said filter means and the second of said two storage reservoirs, a first check valve device for preventing back flow of compressed fluid from the second of said two storage reservoirs to said purge reservoir, a second check valve device for preventing back flow of compressed fluid from said purge reservoir to said filter means, a restricted by-pass conduit connected in parallel to said second check valve device, a cut-off valve device for cutting off the supply of fluid under pressure from said compressor to said filter means, a drain valve device operable to open the interior of said filter means to atmosphere, and means operated in consequence of the pressure in the second of said storage reservoirs reaching a chosen value to effect substantially simultaneous operation of said cut-off valve device and said drain valve device to, respectively, cut-off communication between said compressor and said filter means, and open a communication from said purge reservoir serially through said restricted by-pass conduit, said filter means and said drain valve device to atmosphere to effect reactivation of said filter means.

References Cited in the file of this patent

UNITED STATES PATENTS

| | | |
|---|---|---|
| 2,316,251 | Kahle et al. | Apr. 13, 1943 |
| 2,440,326 | Cadman | Apr. 27, 1948 |
| 2,753,046 | Williams | July 3, 1956 |
| 2,765,868 | Parks | Oct. 9, 1956 |
| 2,955,673 | Kennedy et al. | Oct. 11, 1960 |